May 25, 1948.  P. LOFSHULT  2,442,273
HAULING DEVICE
Filed Oct. 21, 1946  2 Sheets-Sheet 1

Fig. 1

INVENTOR.
Paul Lofshult
BY
Sam J. Slotsky
ATTORNEY

May 25, 1948.　　　　P. LOFSHULT　　　　2,442,273
HAULING DEVICE
Filed Oct. 21, 1946　　　　2 Sheets-Sheet 2
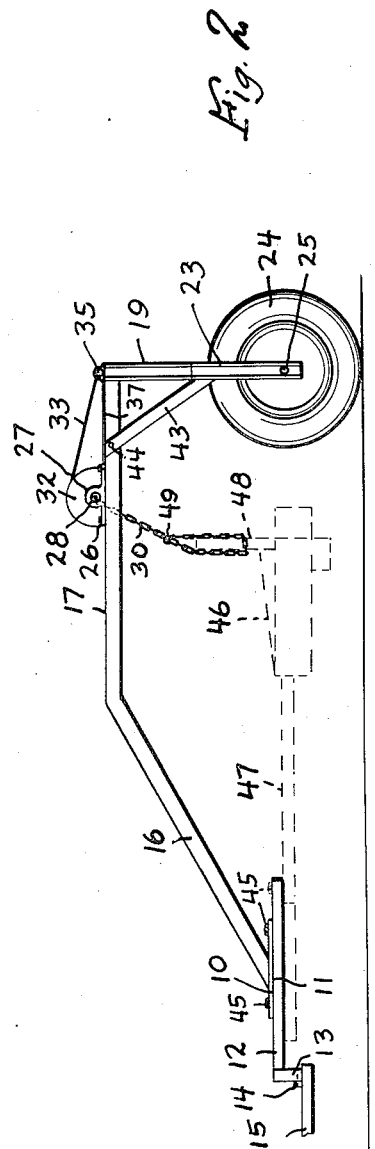
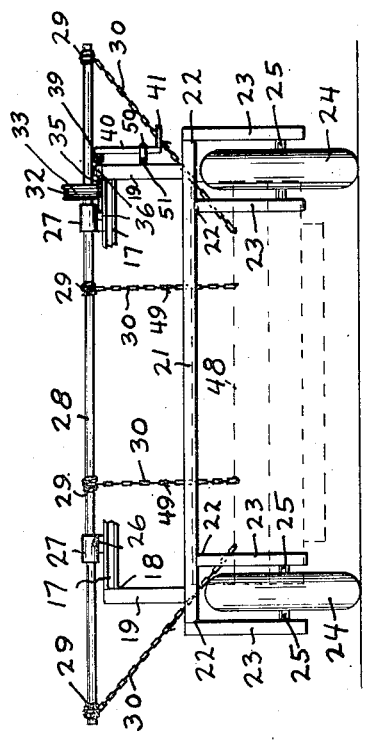
INVENTOR.
Paul Lofshult
BY
ATTORNEY Patented May 25, 1948

2,442,273

UNITED STATES PATENT OFFICE 2,442,273

HAULING DEVICE

Paul Lofshult, Sloan, Iowa

Application October 21, 1946, Serial No. 704,624

2 Claims. (Cl. 214—65.3)

My invention relates to a hauling device.

An object of my invention is to provide a hauling arrangement which can be adapted to bodily raise a farm or other implement, to transport the same.

A further object of my invention is to provide adjustable means whereby the transported device can be carried regardless of size or shape.

A further object of my invention is to provide in combination with the arrangement, suitable means for hitching the same to a pulling tractor or other vehicle.

A further object of my invention is to provide such an arrangement which is readily operable, which distributes the load equally thereon and which is simple in manufacture.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the device,

Figure 2 is a side elevation of the device, and

Figure 3 is a rear view of the device.

I have used the character 10 to designate a flat bearing plate to which is attached at 11 a member 12 including the downwardly projecting portion 13 which is attached at 14 to the projecting hitch portion 15 of a powered vehicle, which vehicle is used for drawing the entire arrangement. Attached to the plate 10 are a pair of upwardly extending channel members 16 which also diverge upwardly and which join the integrally formed portions 17 which are horizontal and which are attached at 18 to the vertical uprights 19 (see Figure 3) which uprights are attached at 20 to the transverse beam 21 to which are attached at 22 the further braces 23, and rotatably mounted between the braces 23 are the wheels 24 having the shafts 25. Attached at 26 to the members 17 are the bearings 27 in which is journalled the transverse pipe 28. Attached to the pipe 28 at 29 are a series of chains 30 terminating in hooks, with these chains being so attached, that they will be wound or reeled on the pipe as it is turned.

Attached at 31 to the pipe 28 is a substantially large diametered reel 32 upon which is wound a cable 33 which cable in turn is wound at 34 about a small diametered shaft 35 which is journalled at 36, with a brace 37 supporting one of the journals, which brace 37 is attached at 38 to one of the members 17. The shaft 35 is attached at 39 to an arm 40 which terminates in the handle 41. The members 17 include a series of equally spaced openings 42. Suitable braces 43 are attached at 44. The member 12 includes a series of openings at 45 to provide means for adjustably securing the member 12 to the plate 10 when varying lengths of the devices to be supported are attached, and the member 12 can be completely removed in many cases to allow room for longer extending transported arrangements.

The character 46 designates by dotted lines a device to be transported, and can designate a farm machine or any other arrangement which includes the forwardly extending bar 47 which is attached through one of the openings 45, the opening for attachment being determined by the length of the member 47. The rear end 48 of the device is attached by passing the chains 30 about any convenient portion thereof and thence engaging the hook 49 with one of the chain links. The handle 40 is then rotated, which turns the shaft 35 which in turn unreels the cable 33 from the reel 31 and turns the pipe 28 which causes the end 48 of the device to be raised off of the ground. By virtue of the large ratio between the shaft 35 and the reel 31, a great amount of power is transmitted to the pipe 28 with little effort so that the device is easily raised, and the forward end then securely bolted. A latching member 50 is pivoted at 51 for retaining the arm 40 in position after the device is raised which member can be pivoted out of the way when the handle is being turned.

As explained heretofore, longer units can be supported by removing the member 12, thereby allowing for complete adjustment and the like.

It will be noted that the spacing of the chains as well as the length of the pipe 28 permits very wide units to be supported, and together with the triangular formation of the device, and the adjustable member 12 permitting a well balanced supporting and transporting arrangement for a variety of different shaped and sized units. The openings 42 permit the bearings 27 to be placed at different positions along the members 17 to carry or balance the load as desired. A brace 52 is attached to the member 17 to strengthen the structure.

It will now be seen that I have provided all of the advantages mentioned in the objects of my invention with further advantages being readily apparent.

Some changes may be made in the construction and arrangement of the parts of my invention without departing from the real spirit and purpose of my invention, and it is my intention to cover by my claims and modified forms of structure or use of mechanical equivalents which may be reasonably included within their scope.

I claim as my invention:

1. A hauling device comprising a wheeled framework, a rotatable shaft journaled to said framework, means for attaching the forward end of the framework to a drawing vehicle, said shaft including chains attached thereto for supporting a transported unit, means for rotating said shaft for elevating said unit to desired position, means for supporting the forward end of the unit to the framework, said shaft rotating means including a large diametered reel attached thereto, a further small diametered reel, a cable attached to both of said reels whereby rotation of the smaller reel will apply a greater power to said shaft, a handle attached to said smaller reel for rotating the same, means for locking said handle where desired, said framework including a plurality of spaced openings, journals in which said shaft is mounted, said journals being attached through said openings, said plurality of openings permitting adjusted position of the shaft with respect to the framework.

2. A hauling device comprising a wheeled framework, a rotatable shaft journalled to said framework, means for attaching the forward end of the framework to a drawing vehicle, said shaft including chains attached thereto for supporting a transported unit, means for rotating said shaft for elevating said unit to desired position, means for locking said shaft after raising said unit, and means for positioning said shaft at any selected position with respect to the framework.

PAUL LOFSHULT.

REFERENCES CITED

The following references are of record in the file of this patent:

UNITED STATES PATENTS

| Number | Name | Date |
| --- | --- | --- |
| 1,182,275 | Hutson et al. | May 9, 1916 |
| 2,164,550 | Steward | July 4, 1939 |
| 2,301,994 | Atkinson | Nov. 17, 1942 |
| 2,317,784 | Lewis | Apr. 27, 1943 |
| 2,376,953 | Allen | May 29, 1945 |